(12) United States Patent
Huang

(10) Patent No.: US 9,498,849 B2
(45) Date of Patent: Nov. 22, 2016

(54) LASER CUTTING DEVICE AND LASER CUTTING METHOD

(71) Applicant: ShenZhen Treasure City Technology Co., LTD., ShenZhen (CN)

(72) Inventor: Yung-Lun Huang, New Taipei (TW)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 396 days.

(21) Appl. No.: 14/252,935

(22) Filed: Apr. 15, 2014

(65) Prior Publication Data

US 2014/0312016 A1 Oct. 23, 2014

(30) Foreign Application Priority Data

Apr. 18, 2013 (TW) .............................. 102113770 A

(51) Int. Cl.
| | |
|---|---|
| *B23K 26/03* | (2006.01) |
| *B23K 26/08* | (2014.01) |
| *B23K 26/38* | (2014.01) |
| *B29D 11/00* | (2006.01) |

(52) U.S. Cl.
CPC ............. *B23K 26/38* (2013.01); *B23K 26/032* (2013.01); *B23K 26/083* (2013.01); *B29D 11/00432* (2013.01)

(58) Field of Classification Search
CPC ... B23K 26/032; B23K 26/083; B23K 26/38
See application file for complete search history.

(56) References Cited

U.S. PATENT DOCUMENTS

| | | | | |
|---|---|---|---|---|
| 3,769,488 A | * | 10/1973 | Hasslinger | ............... A41H 3/00 219/121.61 |
| 5,304,773 A | * | 4/1994 | Kilian | .................... B23K 26/04 219/121.78 |
| 2012/0298636 A1 | * | 11/2012 | Nomaru | ............... B23K 26/032 219/121.61 |
| 2013/0073071 A1 | * | 3/2013 | Culp | .................... B23K 26/083 700/108 |

* cited by examiner

*Primary Examiner* — Ryan Reis
(74) *Attorney, Agent, or Firm* — Zhigang Ma

(57) ABSTRACT

A laser cutting device is configured for cutting an original product. The original product includes a stub bar and an optical element. The laser cutting device includes a support member and a cutting member. The original product is moveably placed on the support member. The cutting member includes a checking unit and a laser cutting unit, and defines a cutting area. The checking unit checks whether the original product moves in the cutting area. The laser cutting unit cuts the original product, thereby separating the stub bar from the optical element if the original product moves in the cutting area.

14 Claims, 3 Drawing Sheets

LASER CUTTING DEVICE AND LASER CUTTING METHOD

FIELD

The present disclosure relates to cutting technologies, and particularly relates to a laser cutting device and a laser cutting method.

BACKGROUND

Optical elements, such as optical lenses or light guide plates used in electronic devices, are easily manufactured using an injection molding die. During the manufacturing of an optical element, an original product, which includes a stub bar and an optical element, are first molded using the injection molding die. Then, the original product is cut to separate the optical element from the stub bar using a cutter, such as a trimming pliers or scissors. However, the mechanical cutting between the cutter and the original product often generates internal stress, which may make cracks appear on the optical element. Furthermore, the cutter becomes dull after a long time of use, which make burrs form at the edges of the optical element.

Therefore, it is desirable to provide a laser cutting device and a laser cutting method using the laser cutting device, to overcome or at least alleviate the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
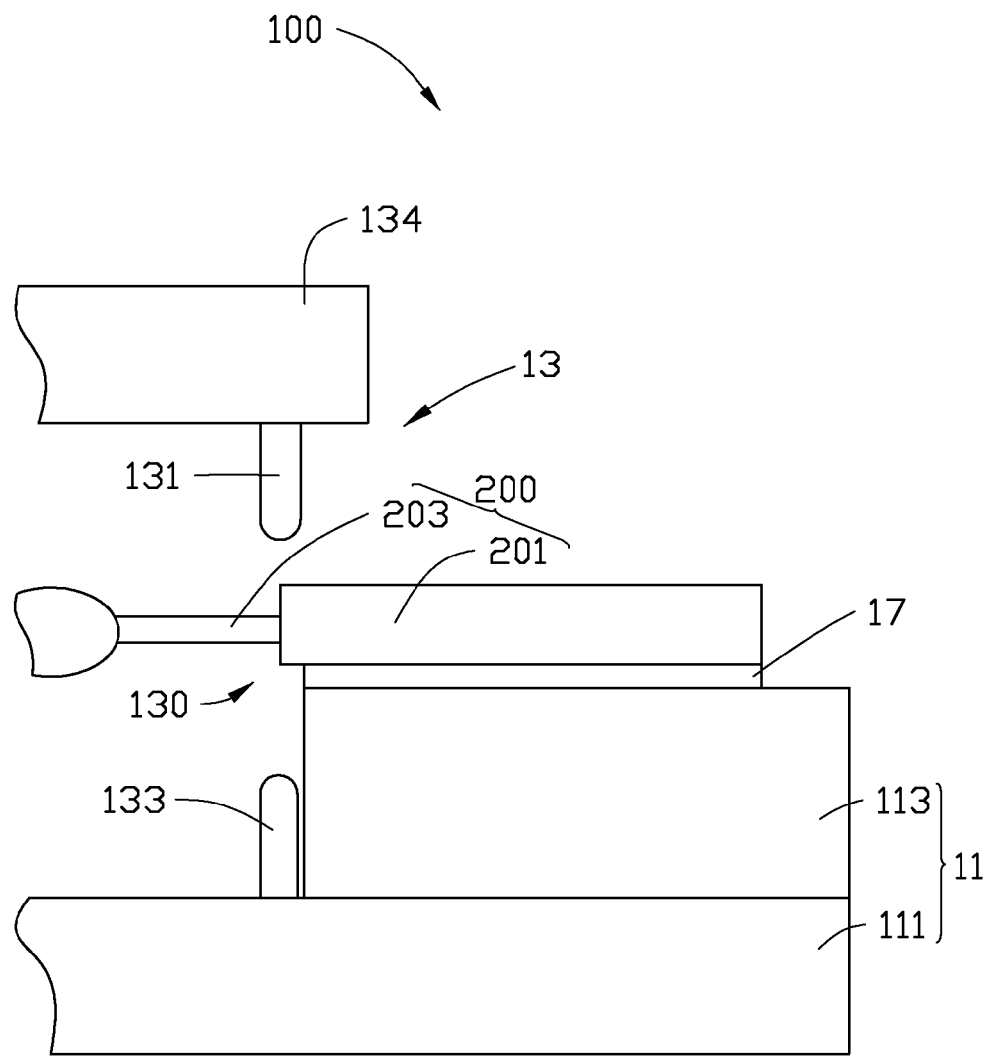
FIG. 1 is a schematic view of an exemplary embodiment of a laser cutting device.
Figure 2:
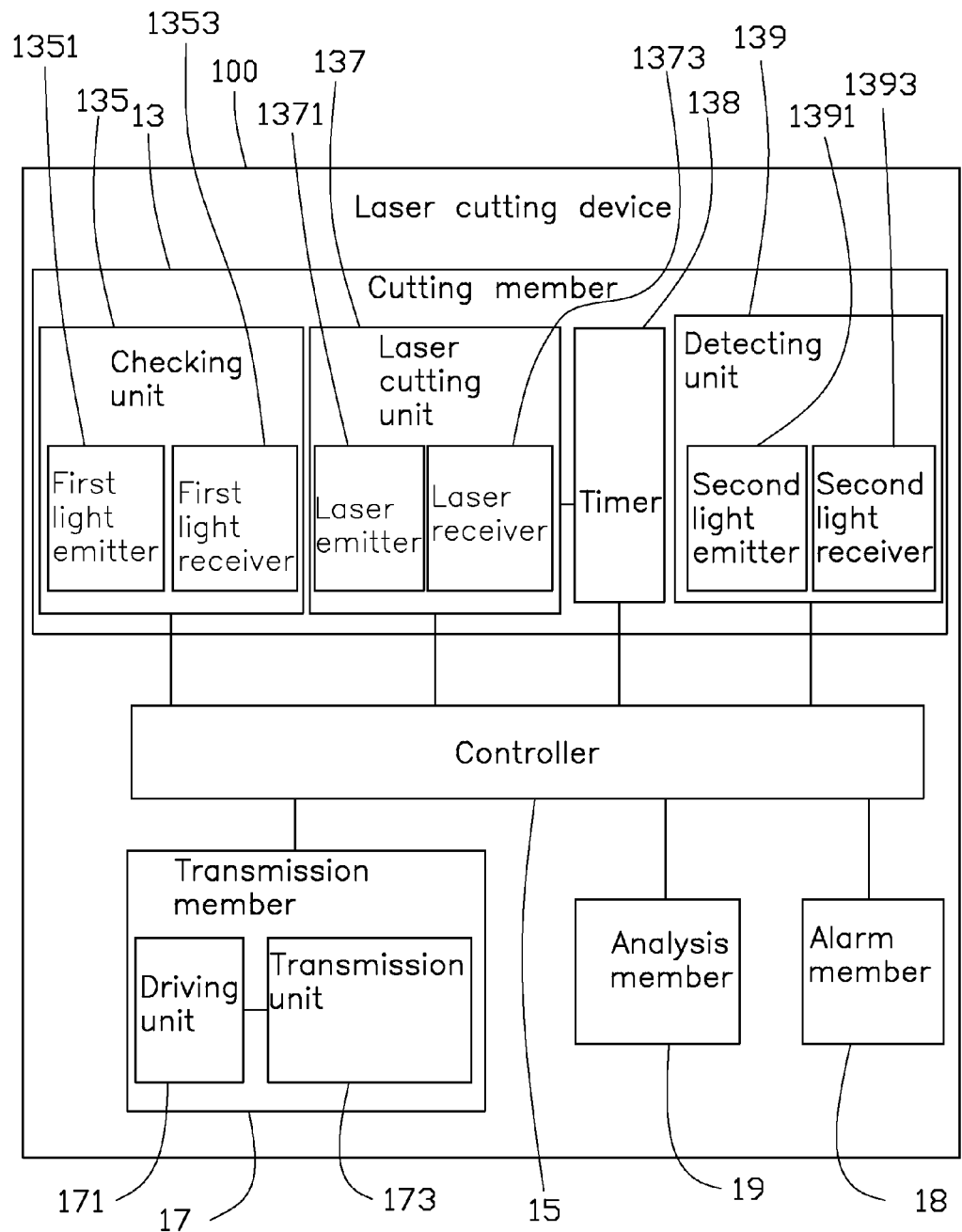
FIG. 2 is a function block diagram of the laser cutting device of FIG. 1.

FIGS. 1 and 2 show an exemplary embodiment of a laser cutting device 100. The laser cutting device 100 is configured to cut an original product 200. In this embodiment, the original product 200 includes a stub bar 203 and an optical element 201. The optical element 201 may be an optical lens or a light guide plate.

The laser cutting device 100 includes a support member 11, a cutting member 13, a controller 15, a transmission member 17, an alarm member 18, and an analysis member 19.

The support member 11 includes a support base 111 and a support stage 113. The support base 111 is configured to support the support stage 113 and the cutting member 13. The support stage 113 is positioned on the support base 111, and is configured to support the original product 200. The original product 200 is moveably placed on the support stage 113.

The cutting member 13 includes a first fixing portion 131, a second fixing portion 133, a checking unit 135, a laser cutting unit 137, a timer 138, and a detecting unit 139.

The first fixing portion 131 is mounted on the support base 111 through a connecting portion 134. In detail, the first fixing portion 131 is spaced apart from the support base 111 and faces the support base 111. The second fixing portion 133 is directly mounted on the support base 111. In detail, the second fixing portion 133 directly extends from the support base 111 toward the first fixing portion 131. The second fixing portion 133 is spaced apart from the first fixing portion 131 to form a cutting area 130, and is substantially aligned with the first fixing portion 131. The support stage 113 directly extends from the support base 111 adjacent to the second fixing portion 133. The support stage 113 is lower than the first fixing portion 131, and is higher than the second fixing portion 133.

The checking unit 135 is configured to check whether the original product 200 moves in the cutting area 130. If the original product 200 moves in the cutting area 130, the checking unit 135 outputs a first checking signal to the controller 15. If the original product 200 does not move in the cutting area 130, the checking unit 135 output a second checking signal to the controller 15.

In this embodiment, the checking unit 135 includes a first light emitter 1351 and a first light receiver 1353. The first light emitter 1351 is mounted on the first fixing portion 131, and the first light receiver 1353 is mounted on the second fixing portion 133 aligning with the first light emitter 1351. The first light emitter 1351 is configured to emit first light beams, and the first light receiver 1353 is configured to receive the first light beams from the first light emitter 1351. If the original product 200 moves in the cutting area 130, an intensity of the first light beams emitted from the first light emitter 1351 is larger than that of the first light beams received by the first light receiver 1353 because the first light beams first penetrate the original product 200 and then reach the first light receiver 1353. If the original product 200 does not move in the cutting area 130, the intensity of the first light beams emitted from the first light emitter 1351 is equal to that of the first light beams received by the first light receiver 1353. That is, the checking unit 135 checks whether the original product 200 moves in the cutting area 130 by means of comparing the intensity of the light beams emitted from the first light emitter 1351 with the intensity of the light beams received by the first light receiver 1353.

The laser cutting unit 137 includes a laser emitter 1371 and a laser receiver 1373. The laser emitter 1371 is mounted on the first fixing portion 131, and is configured to emit laser beams toward the original product 200 in the cutting area 130. The laser receiver 1373 is mounted on the second fixing portion 133 to align with the laser receiver 1373, and is configured to output an enhancement signal to the controller 15 if the laser receiver 1373 does not receive the laser beams from the laser emitter 1371.

The timer 138 is electrically connected to the laser cutting unit 137 and the analysis member 19. The timer 138 is configured to count the time of cutting the original product 200 by the laser cutting unit 137, and to output time data to the analysis member 19.

The detecting unit 139 is configured to detect whether the optical element 201 is completely separated from the stub bar 203 when the time data is larger than or equals to a predetermined period. The predetermined period is manually pre-set in the analysis member 19. Ideally, if the laser emitter 1371 emits laser beams toward the original product 200 in the cutting area 130 for the predetermined period, the optical element 201 will be completely separated from the stub bar 203. If the optical element 201 is not completely separated from the stub bar 203, the detecting unit 139 output a first detecting signal to the controller 15. If the optical element 201 is completely separated from the stub bar 203, the detecting unit 139 output a second detecting signal to the controller 15.

In this embodiment, the detecting unit 139 includes a second light emitter 1391 and a second light receiver 1393. The second light emitter 1391 is mounted on the first fixing portion 131, and the second light receiver 1393 is mounted on the second fixing portion 133 to align with the second light emitter 1391. The second light emitter 1391 is configured to emit second light beams when the time data is larger than or equals to the predetermined period. If the optical element 201 is not completely separated from the stub bar 203, an intensity of the second light beams emitted from the second light emitter 1391 is larger than that of the second light beams received by the second light receiver 1393 because the second light beams first penetrate the original product 200 and then reach the second light receiver 1393. If the optical element 201 is completely separated from the stub bar 203, the intensity of the second light beams emitted from the second light emitter 1391 is equal to that of the second light beams received in the second light receiver 1393. That is, the detecting unit 139 detects whether the optical element 201 is completely separated from the stub bar 203 by means of comparing the intensity of the light beams emitted from the second light emitter 1391 with the intensity of the light beams received by the second light receiver 1393.

The transmission member 17 is positioned on the support stage 113, and is configured to move the original product 200 in the cutting area 130. In detail, the transmission member 17 includes a driving unit 171 and a transmission unit 173. In this embodiment, the driving unit 171 is a motor. The transmission unit 173 is electrically connected to the driving unit 171 and supports the original product 200. The driving unit 171 drives the transmission unit 173 to move, thereby moving the original product 200 in the cutting area 130.

The alarm member 18 is configured to provide a warning signal which represents finish of the cutting process to users. The warning signal can be sound alarm or color warning.

The analysis member 19 is configured to compare the time data with the predetermined period, and to output a starting signal to the controller 15 if the time data is larger than or equals to a predetermined period.

The controller 15 is electrically connected to the checking unit 135, the transmission member 17, the laser cutting unit 137, the detecting unit 139, the alarm member 18, and the analysis member 19. The controller 15 is configured to control the laser emitter 1371 to emit first laser beams in response to the first checking signal, to control the driving unit 171 to drive the transmission unit 173 together with the original product 200 to move in the cutting area 130 in response to the second checking signal, to increase the intensity of the laser emitter 1371 in response to the enhancement signal, to control the laser emitter 1371 to continue emitting first laser beams in response to the first detecting signal, to control the alarm member 18 to provide the warning signal, and to control the detecting unit 139 to detect whether the optical element 201 is completely separated from the stub bar 203 in response to the starting signal.

Figure 3:
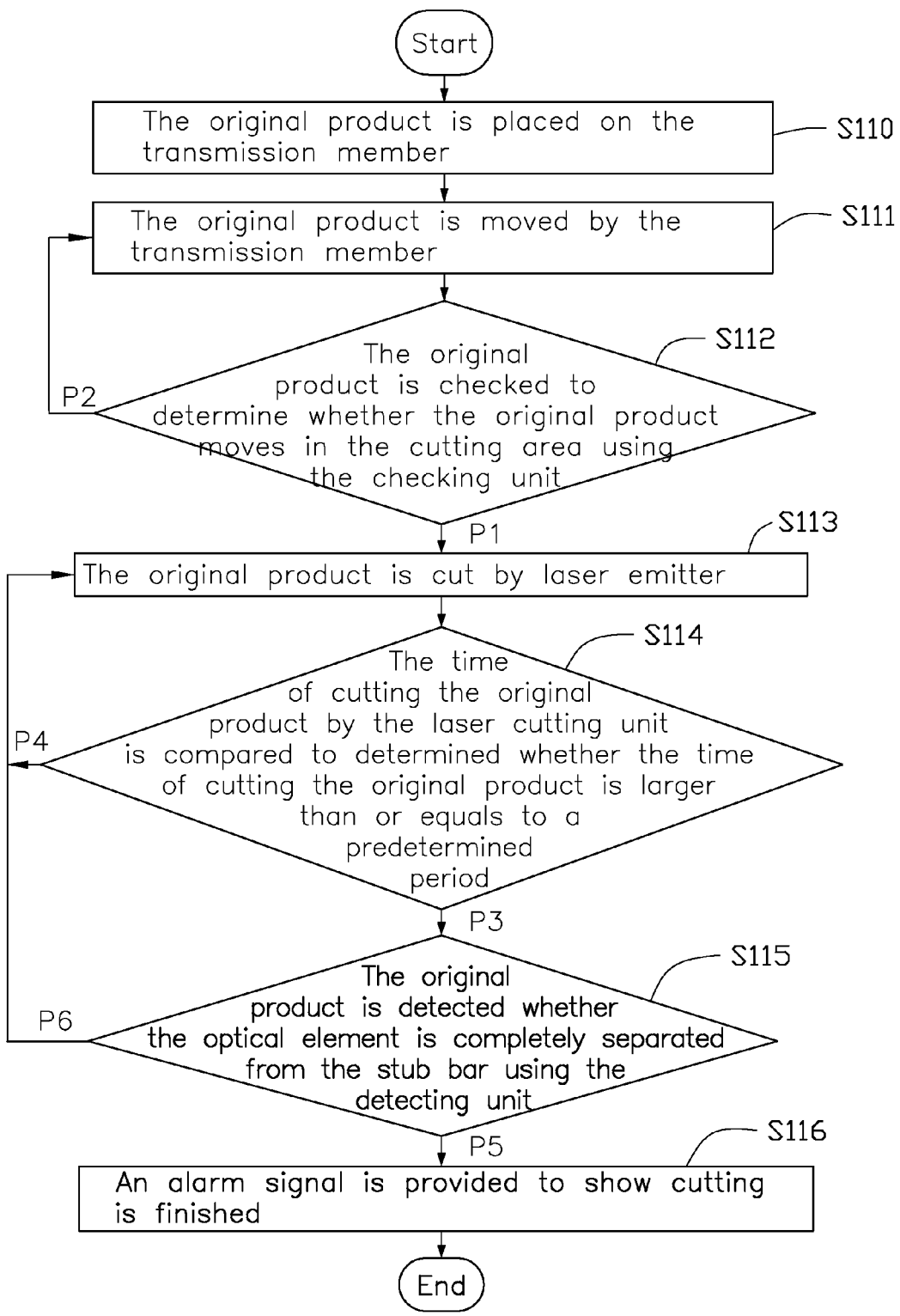
FIG. 3 is a flowchart of a laser cutting method of the laser cutting device of FIG. 1.

FIG. 3 shows a laser cutting method for cutting the original product 200 using the laser cutting device 100 includes the following steps.

In Step S110, the original product 200 is placed on the transmission member 17.

In Step S111, the transmission member 17 moves the original product 200.

In Step S112, the checking unit 135 determines whether the original product 200 moves in the cutting area 130. If the original product 200 does not move in the cutting area 130, the method follows path P1 to implement Step S111 again. If the original product 200 moves in the cutting area 130, the method follows path P2 to implement Step S113.

In Step S113, the laser emitter 1371 cuts the original product 200.

In Step S114, the time of cutting the original product 200 by the laser cutting unit 137 is compared to determined whether the time of cutting the original product 200 is larger than or equal to a predetermined period. If the time of cutting the original product 200 is larger than or equal to a predetermined period, the method follows the path P3 to implement Step S115. If the time of cutting the original product 200 is less than the predetermined period, the method follows the path P4 to implement Step S113 again. The step S114 is executed by the analysis member 19.

In Step S115, the original product 200 is detected whether the optical element 201 is completely separated from the stub bar 203 using the detecting unit 139. If the optical element 201 is completely separated from the stub bar 203 using the detecting unit 139, the method follows the path P5 to implement Step S116. If the optical element 201 is not completely separated from the stub bar 203 using the detecting unit 139, the method follows the path P6 and P4 to implement Step S113.

In Step S116, an warning signal is provided to show cutting is finished. The step S116 is executed by the alarm member 18.

During the-above described laser cutting method, the original product 200 is cut by laser beams instead of by a traditional cutter, such as trimming pliers or a scissor. No burring is created even after long usage of the laser cutting device 100, and there is no cracking of material because there is no internal stress.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A laser cutting device for cutting an original product, the original product including a stub bar and an optical element, the laser cutting device comprising:
   a support member configured for movable placement of the original product on the support member, and
   a cutting member defining a cutting area and including a checking unit configured to check whether the original product moves in the cutting area, and a laser cutting unit configured to cut the original product to separate the stub bar from the optical element when the original product moves in the cutting area.

2. The laser cutting device of claim 1, further comprising a controller electrically connected to the cutting member, wherein the checking unit outputs a first checking signal to the controller when the original product moves in the cutting area, and the control is configured to control the laser cutting unit to cut the original product in response to the first checking signal.

3. The laser cutting device of claim 2, further comprising a transmission member, wherein the transmission member is configured to move the original product on the support member.

4. The laser cutting device of claim 3, wherein the cutting member further includes a first fixing portion and a second fixing portion, and the support member includes a support base and a support stage located on the support base, the first fixing portion is spaced apart from the support base, the second fixing portion is directly mounted on the support base and is spaced apart from the first fixing portion to form the cutting area therebetween.

5. The laser cutting device of claim 4, wherein the support stage directly extends from the support base adjacent to the second fixing portion, and the support stage is lower than the first fixing portion, and is higher than the second fixing portion.

6. The laser cutting device of claim 4, wherein the checking unit comprises a first light emitter and a first light receiver, the first light emitter is mounted on the first fixing portion, the first light receiver is mounted on the second fixing portion to align with the first light emitter, the first light emitter is configured to emit first light beams, the first light receiver is configured to receive the first light beams from the first light emitter, the checking unit is configured to check whether the original product moves in the cutting area by means of comparing an intensity of the light beams emitted from the first light emitter with an intensity of the light beams received by the first light receiver.

7. The laser cutting device of claim 6, wherein when the intensity of the light beams emitted from the first light emitter is larger than that of the light beams received by the first light receiver, the checking unit outputs the first checking signal to the controller, and when the intensity of the light beams emitted from the first light emitter is equal to that of the light beams received by the first light receiver, the checking unit outputs a second checking signal to the controller, and the controller is configured to control the transmission member to move the original product in the cutting area.

8. The laser cutting device of claim 6, wherein the transmission member comprises a driving unit and a transmission unit electrically connected to the driving unit, the transmission unit is located on the support stage and supports the original product, and the driving unit is configured to drive the transmission unit together with the original product to move.

9. The laser cutting device of claim 6, wherein the cutting member further comprises a detecting unit, the detecting unit is configured to detect whether the optical element is completely separated from the stub bar, and when the optical element is not completely separated from the stub bar, the laser cutting unit continues to cut the original product.

10. The laser cutting device of claim 9, wherein the detecting unit comprises a second light emitter and a second light receiver, the second light emitter is mounted on the first fixing portion, the second light receiver is mounted on the second fixing portion to align with the second light emitter, and the second light emitter is configured to emit second light beams, the second light receiver is configured to receive the second light beams from the second light emitter, the detecting unit detects whether the optical element is completely separated from the stub bar by means of comparing the intensity of the light beams emitted from the second light emitter with the intensity of the light beams received by the second light receiver.

11. The laser cutting device of claim 10, further comprising an alarm member, wherein when the optical element is not completely separated from the stub bar, the detecting unit output a first detecting signal to the controller, and when the optical element is completely separated from the stub bar, the detecting unit output a second detecting signal to the controller, and the controller is configured to control the laser cutting unit to cut the original product in response to the first detecting signal, and to control the alarm member to provide a warning signal.

12. The laser cutting device of claim 4, wherein the laser cutting unit comprises a laser emitter and a laser receiver, the laser emitter is mounted on the first fixing portion, and the laser emitter is configured to emit laser beams toward the original product in the cutting area, the laser receiver is mounted on the second fixing portion to align with the laser receiver, and the laser receiver is configured to output an enhancement signal to the controller if the laser receiver does not receive the laser beams from the laser emitter.

13. A laser cutting method of cutting an original product including a stub bar and an optical element, the laser cutting method comprising:
    placing the original product on the support member;
    moving the original product;
    checking whether the original product moves in the cutting area; and
    cutting the original product when the original product moves in the cutting area.

14. The laser cutting method of claim 13, further comprising:
    detecting whether the optical element is completely separated from the stub bar; and
    continuing to cut the original product when the optical element is not completely separated from the stub bar.

* * * * *